US007286192B2

(12) United States Patent
Lin et al.

(10) Patent No.: US 7,286,192 B2
(45) Date of Patent: Oct. 23, 2007

(54) TRANSFLECTIVE LIQUID CRYSTAL DISPLAY

(75) Inventors: Ching-Huan Lin, Hsin Ying (TW); Ching-Yu Tsai, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 340 days.

(21) Appl. No.: 11/146,568

(22) Filed: Jun. 7, 2005

(65) Prior Publication Data

US 2006/0274008 A1 Dec. 7, 2006

(51) Int. Cl.
*G02F 1/136* (2006.01)

(52) U.S. Cl. ............................ 349/41; 349/38; 349/48

(58) Field of Classification Search .................. 349/38, 349/39, 41, 48
See application file for complete search history.

(56) References Cited

U.S. PATENT DOCUMENTS 5,841,494 A 11/1998 Hall ............................ 349/98
6,008,871 A 12/1999 Okumura ..................... 349/61
6,124,905 A 9/2000 Iijima .......................... 349/62
6,199,989 B1 3/2001 Maeda et al. ............... 359/613
6,466,280 B1 10/2002 Park et al. ..................... 349/43
6,508,560 B2 1/2003 Epstein et al. .............. 359/606
6,567,060 B1 5/2003 Sekiguchi .................... 345/87
6,567,141 B1 5/2003 Kaneko et al. ............. 349/117
6,574,044 B1 6/2003 Sahouani et al. ........... 359/498
6,577,361 B1 6/2003 Sekiguchi et al. ............ 349/96
6,580,480 B2 6/2003 Baek et al. ................. 349/114
6,606,139 B2 8/2003 Yoshii et al. ............... 349/114
6,608,660 B1 8/2003 Okamoto et al. ........... 349/113
6,611,305 B2 8/2003 Kamijo et al. .............. 349/112
6,628,369 B2 9/2003 Kumagai et al. ........... 349/194
2004/0004685 A1 1/2004 Luo ........................... 349/113
2007/0064182 A1* 3/2007 Lin et al. .................... 349/114

* cited by examiner

*Primary Examiner*—David Nelms
*Assistant Examiner*—David Chung
(74) *Attorney, Agent, or Firm*—Ware, Fressola, Van Der Sluys & Adolphson LLP

(57) ABSTRACT

A transflective liquid crystal display having a plurality of pixels, each pixel having a plurality of color sub-pixels, each sub-pixel having a transmission area associated with a first charge storage capacitance and a reflection area associated with a second storage capacitance. In the sub-pixel, a data line, a first gate line, a second gate line and a common line are used to control the operational voltage on the liquid crystal layer associated with the sub-pixel. The first and second gate lines are separately set at a first state and a second state. The ratio of the first charge storage capacitance to the second charge storage capacitance can be controlled according to the states of the gate lines. The second charge storage capacitance is provided by two capacitors connected in parallel through a switching element which can be open or closed according to the states of the gate lines.

14 Claims, 12 Drawing Sheets

TRANSFLECTIVE LIQUID CRYSTAL DISPLAY

FIELD OF THE INVENTION

The present invention relates generally to a liquid crystal display panel and, more particularly, to a transflective-type liquid crystal display panel.

BACKGROUND OF THE INVENTION

Due to the characteristics of thin profile and low power consumption, liquid crystal displays (LCDs) are widely used in electronic products, such as portable personal computers, digital cameras, projectors, and the like. Generally, LCD panels are classified into transmissive, reflective, and transflective types. A transmissive LCD panel uses a back-light module as its light source. A reflective LCD panel uses ambient light as its light source. A transflective LCD panel makes use of both the back-light source and ambient light.

As known in the art, a color LCD panel 1 has a two-dimensional array of pixels 10, as shown in FIG. 1. Each of the pixels comprises a plurality of sub-pixels, usually in three primary colors of red (R), green (G) and blue (B). These RGB color components can be achieved by using respective color filters. FIG. 2 illustrates a plan view of the pixel structure in a conventional transflective liquid crystal panel, and FIGS. 3*a* and 3*b* are cross sectional views of the pixel structure. As shown in FIG. 2, a pixel can be divided into three sub-pixels 12R, 12G and 12B and each sub-pixel can be divided into a transmission area (TA) and a reflection area (RA). In the transmission area as shown in FIG. 3*a*, light from a back-light source enters the pixel area through a lower substrate 30, and goes through a liquid crystal layer, a color filter R and the upper substrate 20. In the reflection area, light encountering the reflection area goes through an upper substrate 20, the color filter R and the liquid crystal layer before it is reflected by a reflective layer 52. Alternatively, part of the reflection area is covered by a non-color filter (NCF), as shown in FIG. 3*b*.

As known in the art, there are many more layers in each pixel for controlling the optical behavior of the liquid crystal layer. These layers may include a device layer 50 and one or two electrode layers. The device layer is typically disposed on the lower substrate and comprises gate lines 31, 32, data lines 21-24 (FIG. 2), transistors, and passivation layers (not shown).

Due to the simplicity in the pixel structure of the conventional transflective LCD panel, high chromaticity is difficult to achieve.

SUMMARY OF THE INVENTION

The present invention provides a method and a pixel structure to improve the viewing quality of a transflective-type liquid crystal display. The pixel structure of a pixel in the liquid crystal display comprises a plurality of sub-pixel segments. Each of the sub-pixel segments comprises a transmission area and a reflection area. In the sub-pixel segment, a data line, a first gate line, a second gate line and a common line are used to control the operational voltage on the liquid crystal layer areas associated with the sub-segments. In particular, the transmission area is associated with a first charge storage capacity and the reflection area is associated with a second storage capacity. The first and second gate lines can be separately set at a first control state and a second control state. The ratio of the first charge storage capacity to the second charge storage capacity can be controlled according to the states of the gate lines.

In the present invention, the transmissive electrode in the transmission area is connected to a first charge capacitor, which is further connected to the data line via a first TFT. The reflective electrode in the reflection area is connected to a second charge capacitor, which is further connected to the data line via a second TFT. Both the gate of the first TFT and the gate of the second TFT are connected to the first gate line.

In the first embodiment of the present invention, the second charge capacitor is connected in parallel to a refresh capacitor via a third TFT and further connected to the common line via a fourth TFT. The gate of the third TFT is connected to the second gate line. The gate of the fourth TFT is connected to the first gate line.

In the second embodiment of the present invention, the first charge capacitor is connected in parallel to a refresh capacitor via a third TFT and further connected to the common line via a fourth TFT. The gate of the third TFT is connected to the second gate line. The gate of the fourth TFT is connected to the first gate line.

In the third embodiment of the present invention, the transmissive electrode is connected to the first capacitor via the first TFT. The transmissive electrode is further connected in parallel to a refresh capacitor and further connected to the common line via the fourth TFT. The gate of the third TFT is connected to the second gate line. The gate of the fourth TFT is connected to the first gate line.

The present invention will become apparent upon reading the description taken in conjunction with FIGS. 4-15*b*.

DETAILED DESCRIPTION OF THE INVENTION

Figure 1:
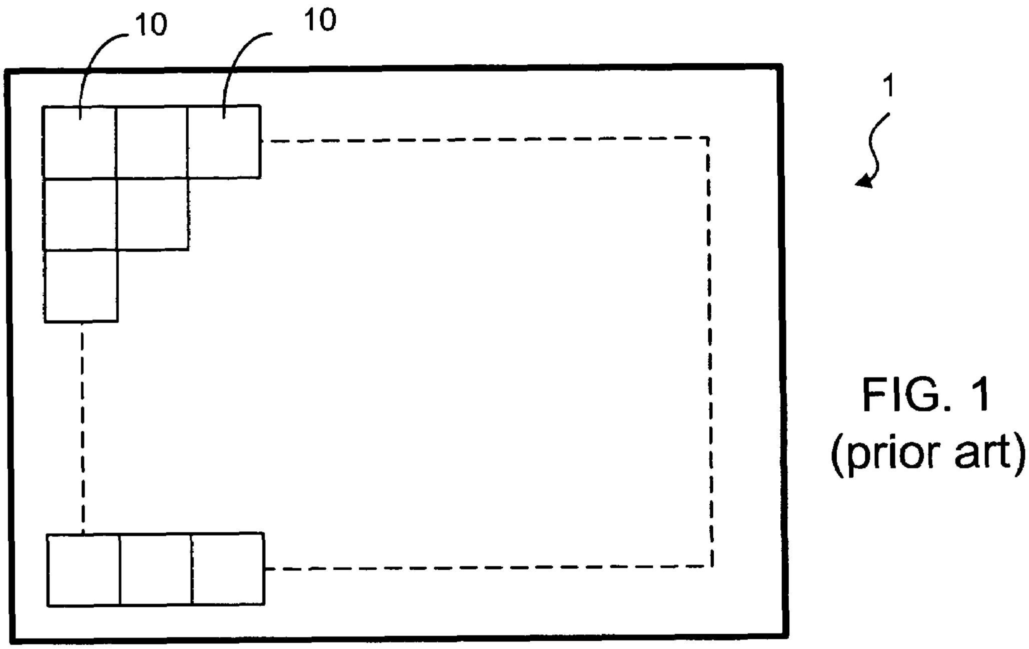
FIG. 1 (prior art)
FIG. 1 is a schematic representation showing a typical LCD display.
Figure 2:
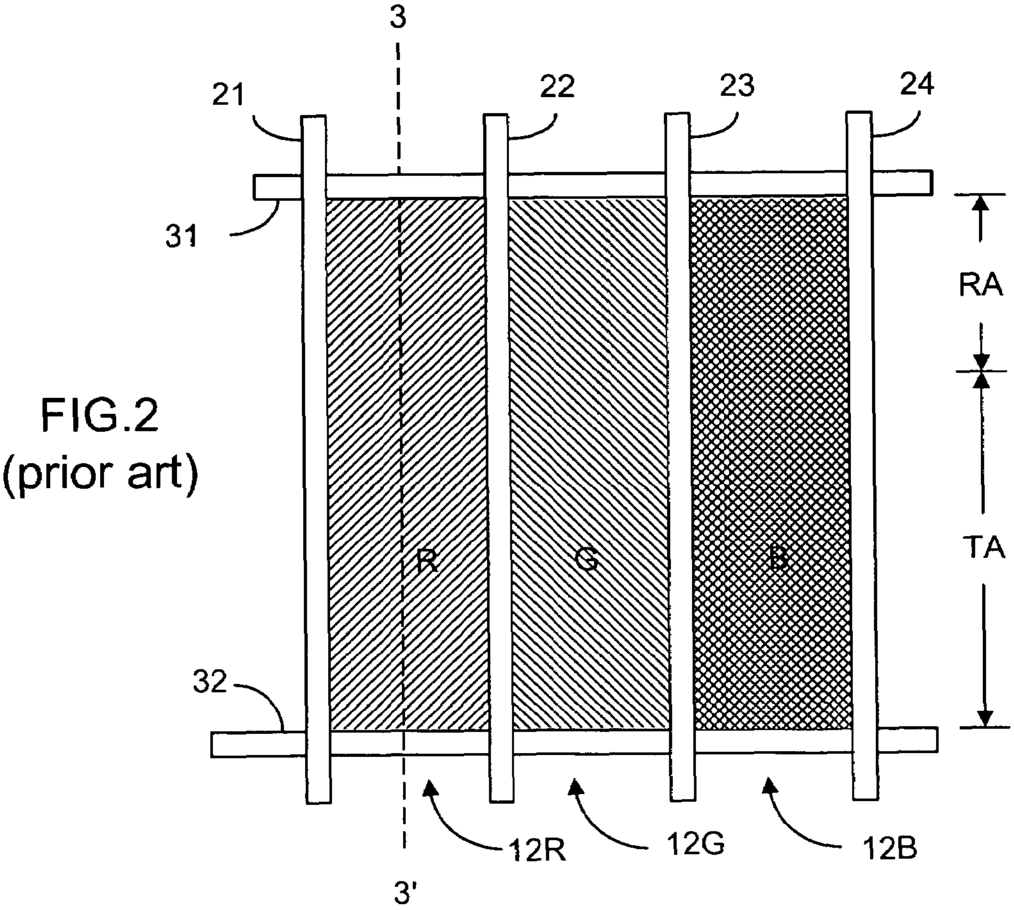
FIG.2 (prior art)
FIG. 2 is a plan view showing the pixel structure of a conventional transflective color LCD display.
Figure 3A:
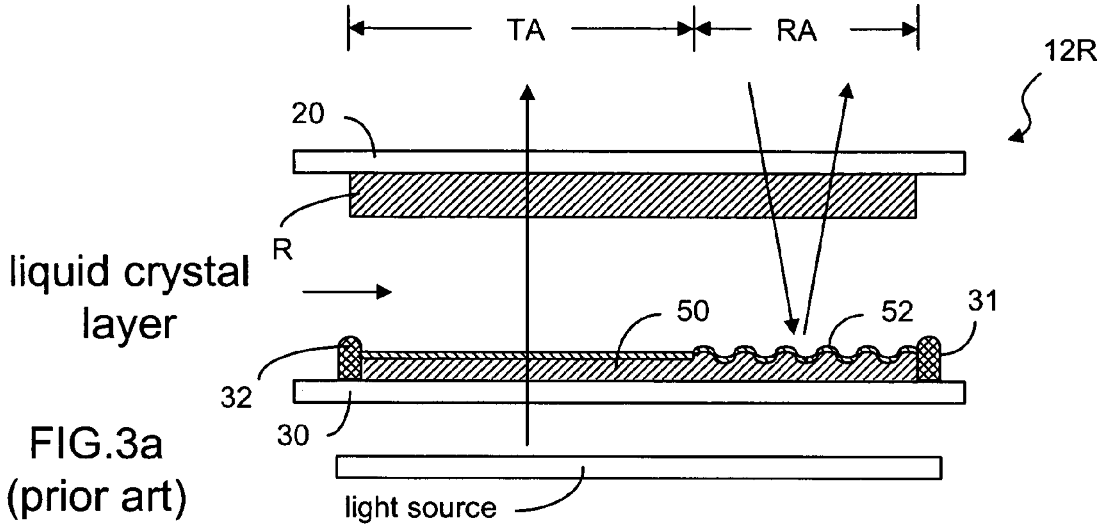
FIG.3a (prior art)
FIG. 3*a* is a cross sectional view showing the reflection and transmission of light beams in the pixel as shown in FIG. 2.
Figure 3B:
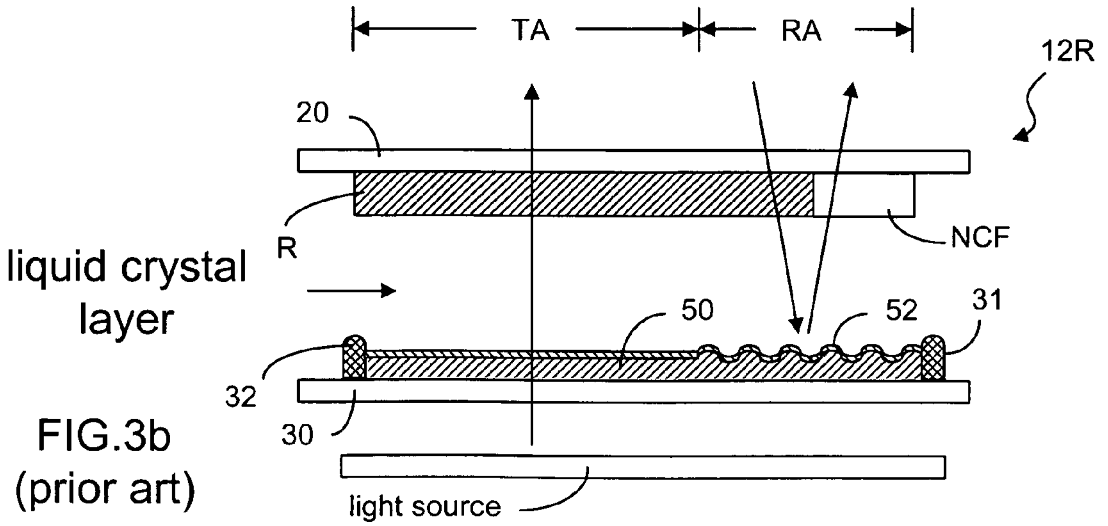
FIG.3b (prior art)
FIG. 3*b* is a cross sectional view showing the reflection and transmission of light beams in another prior art transflective display.
Figure 4:
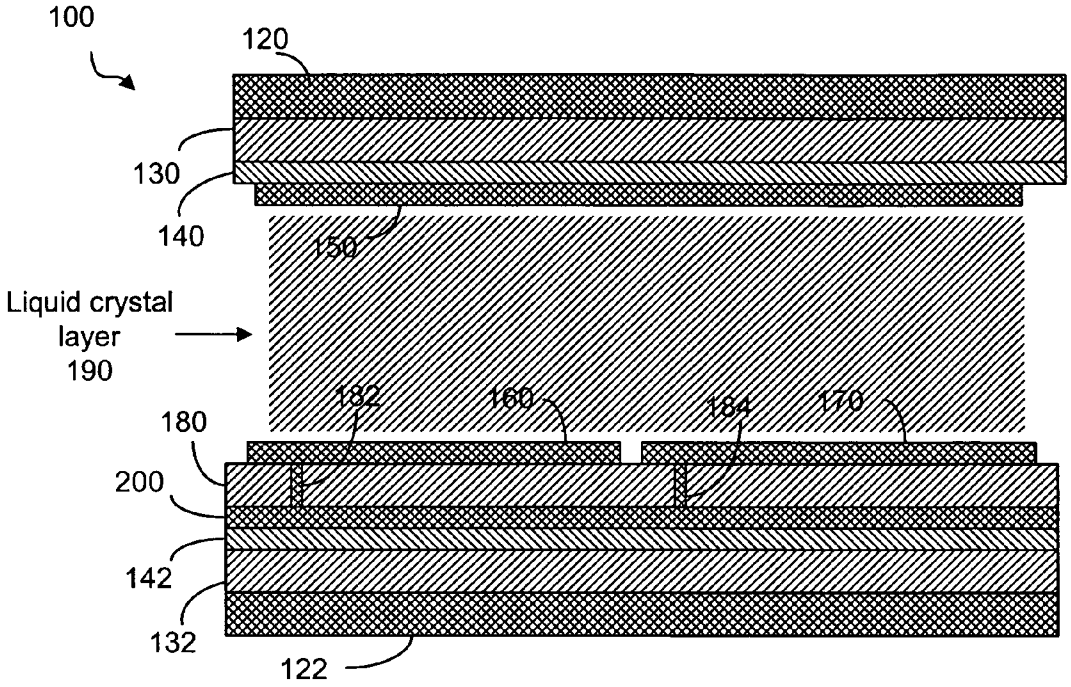
FIG. 4 is a cross sectional view showing a sub-pixel segment in an LCD display, according to the present invention.

A sub-pixel segment, according to the present invention, is shown in FIG. 4. As shown, the sub-pixel segment 100 has an upper layer structure, a lower layer structure and a liquid crystal layer 190 disposed between the upper layer structure and the lower layer structure. The upper layer comprises a polarizer 120, a haft-wave plate 130, a quarter-wave plate 140 and an upper electrode 150. The upper electrode 150 is made from a substantially transparent material such as ITO (Indium-tin oxide). The lower layer structure comprises an electrode layer having a transmission electrode 160 and a reflection electrode 170. The transmission electrode 160 is made from a transparent material such as ITO. The reflection electrode 170 also serves as a reflector and is made from one or more highly reflective metals such as Al, Ag, Cr, Mo, Ti, and A1Nd. The lower layer structure further comprises a passivation layer (PL) 180, a device layer 200, a quarter-wave plate 142, a half-wave plate. 132 and a polarizer 122. In addition, the transmission electrode 160 is electrically connected to the device layer 180 via a connector 182, and the reflection electrode 170 is electrically connected to the device layer 180 via a connector 184.

Figure 5A:
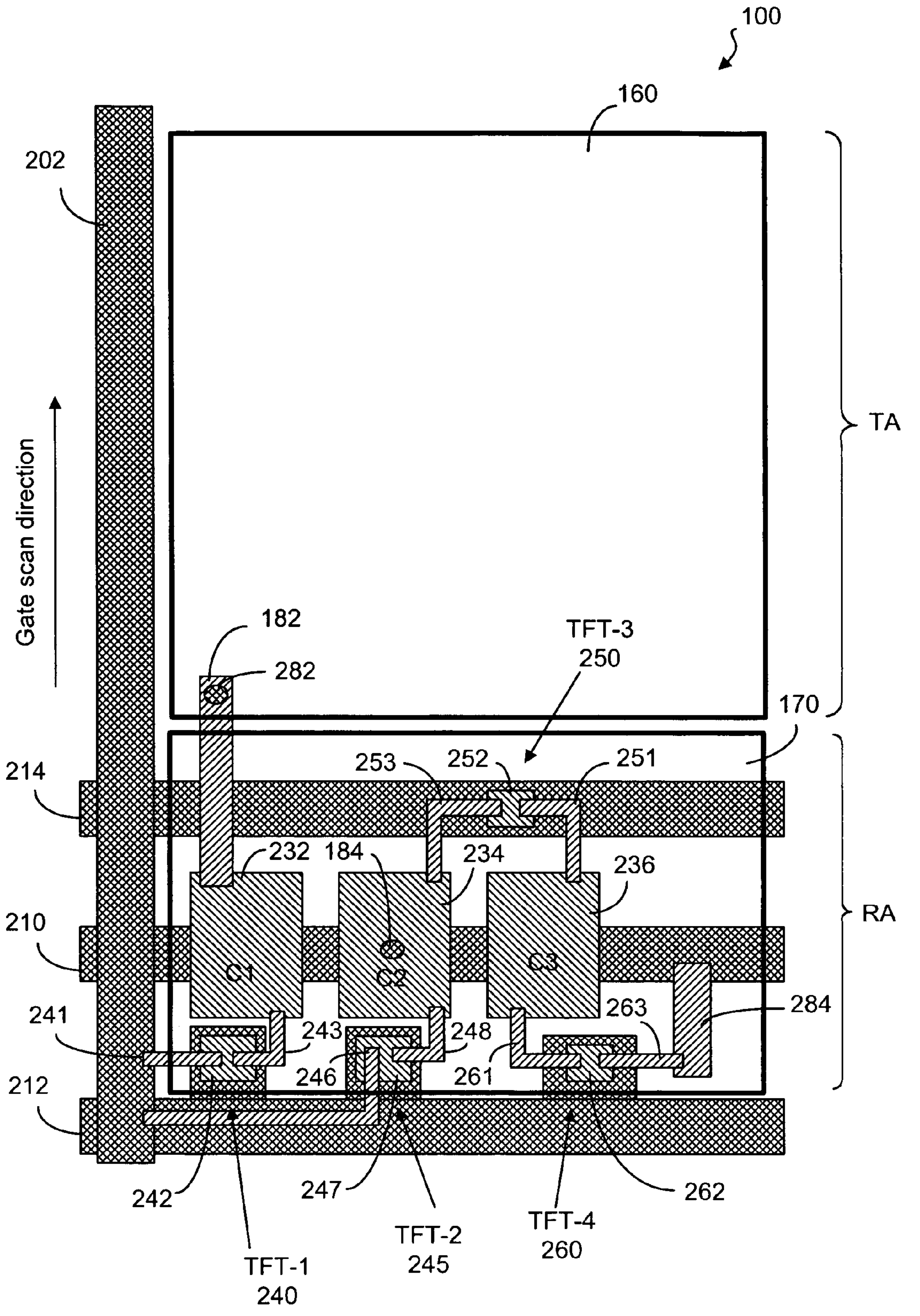
FIG. 5*a* is a plan view showing a sub-pixel segment, according to one embodiment of the present invention.

The plan view of the sub-pixel segment 100 is shown in FIG. 5*a*. As shown, the transmission electrode 160 is operatively connected to a first storage capacitor 232 (C1) via connectors 182 and 282. The reflection electrode 170 is operatively connected to a second storage capacitor 234 (C2) via the connector 184. The sub-pixel segment 100 also has a refresh capacitor 236 (C3) and four switching elements 240 (TFT-1), 245 (TFT-2), 250 (TFT-3) and 260 (TFT-4) for controlling the charging and discharging of the storage capacitors through the common line 210. The first switching element 240 has two switch ends 241, 243 and a control end 242. The switch end 241 is connected to a data line 202; the switch end 243 is connected to the first storage capacitor 232 and the control end 242 is connected to a first gate line 212 (gate-line 1). The second switching element 245 has two switch ends 246, 248 and a control end 247. The switch end 246 is connected to the data line 202; the switch end 248 is connected to the second storage capacitor 234; and the control end 247 is connected to the first gate-line 212 (gate-line 1). The third switching element 250 has two switch ends 251, 253 and a control end 252. The switch end 253 is connected to the second storage capacitor 234; the switch end 251 is connected to the refresh capacitor 236; and the control end 252 is connected to a second gate-line 214 (gate-line 2). The fourth switching element 260 has two switch ends 261, 263 and a control end 262. The first switch end 261 is connected to the refresh capacitor 236, and the second switch end 263 is connected to the common line 210 via a connector 284. The control end 262 is also connected to the first gate line 212.

Figure 5B:
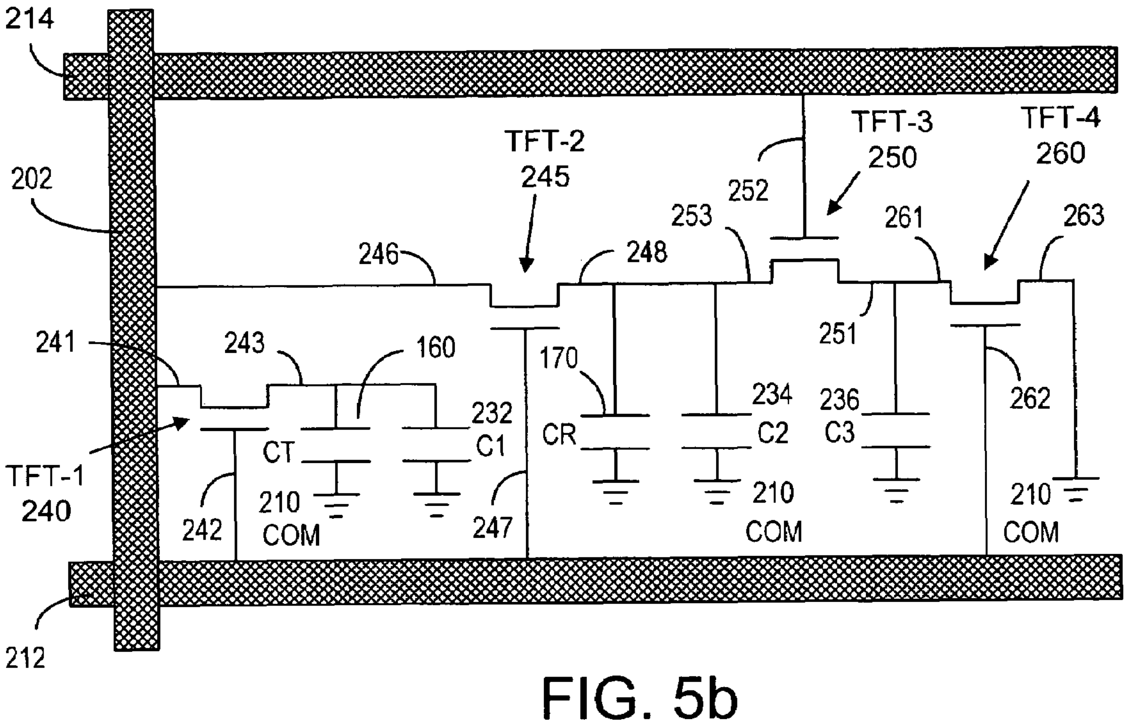
FIG. 5*b* is a circuit diagram showing an equivalent circuit of the sub-pixel segment of FIG. 5*a*.
Figure 6A:
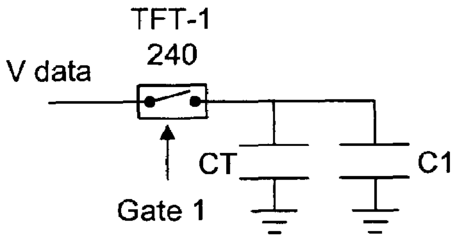
FIG. 6*a* is the equivalent circuit of the transmission area in the sub-pixel segment of FIG. 5*a*
Figure 6B:
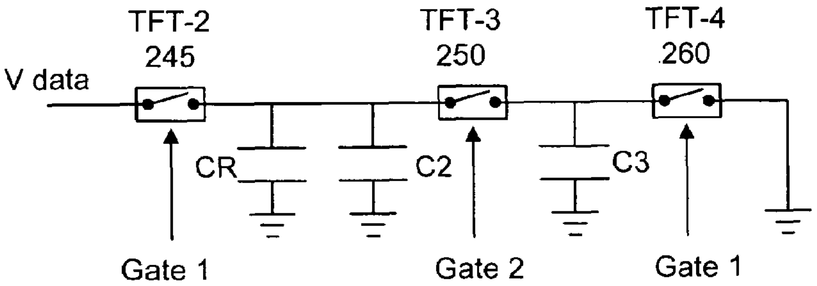
FIG. 6*b* is the equivalent circuit of the reflection area in the sub-pixel segment of FIG. 5*a*

The equivalent circuit for the electronic components in the sub-pixel segment 100 is shown in FIG. 5*b*. As shown, the transmission electrode 160 has a capacitance CT connected to the first storage capacitor 232 in parallel. These capacitors are connected to the data line 202 via the first switching element 240. The reflection electrode 170 has a capacitance CR separately connected to the second storage capacitor 234 in parallel. These capacitors are separately connected to the data line 202 via the second switching element 245. The capacitor 234 is also connected to the refresh capacitor 236 in parallel via the third switching element 250. The refresh capacitor 236 is also connected to the common line 210 through the fourth switching element 260. As shown in FIG. 6*a*, the charging and discharging of the capacitors CT and C1 is controlled by gate-line 1 through the first switching element 240. As shown in FIG. 6*b*, the charging and discharging of the capacitors CR, C2 and C3 are controlled by gate-line 2 through the third switching element 250, and by gate-line 1 through both the second switching element 245 and the fourth switching element 260.

Figure 7A:
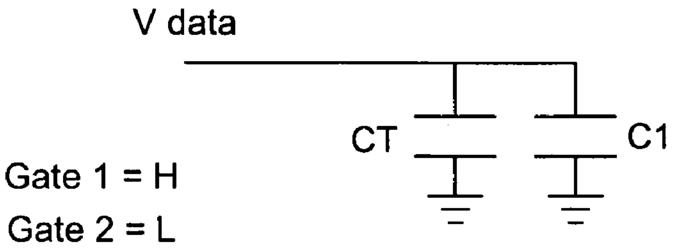
FIG. 7*a* is the equivalent circuit of the transmission area in the sub-pixel segment when the gate lines are set at a first control state.
Figure 7B:
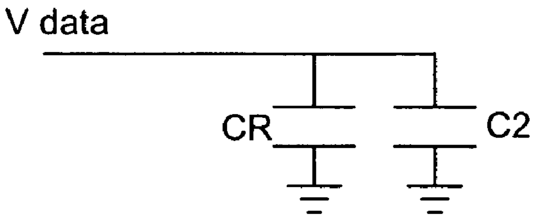
FIG. 7*b* is the equivalent circuit of the reflection area in the sub-pixel segment when the gate lines are set at the first control state
Figure 7C:
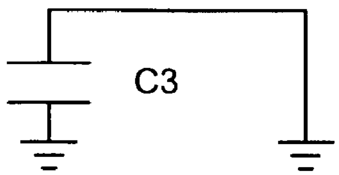
FIG. 7*c* is the equivalent circuit of the control capacitor, when the gate lines are set at the first control state.

In the first control state, gate-line 1 is set to high and gate-line 2 is set to low. When gate-line 1=high, the switching elements 240, 245 and the switching element 260 are closed ("ON"). When gate-line 2=low, the switching element 250 is open ("OFF"). In this control state, the capacitors CT and C1 are connected to the data line 202, as shown in FIG. 7*a*. Thus, the transmission electrode 160 has the same potential ($V_{data}$) of the data line 202. The capacitors CR and C2 are operatively connected to the data line 202, but disconnected from the refresh capacitor C3, as shown in FIGS. 7*b* and 7*c*. Thus, the reflection electrode 170 has the same potential ($V_{data}$) of the data line 202. The refresh capacitor C3 is discharged, but its potential is in equilibrium with the voltage on common line 210.

Figure 8A:
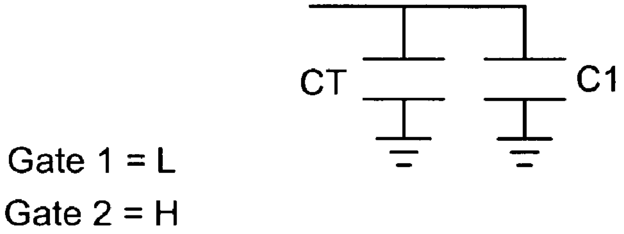
FIG. 8*a* is the equivalent circuit of the transmission area in the sub-pixel segment when the gate lines are set at a second control state.
Figure 8B:
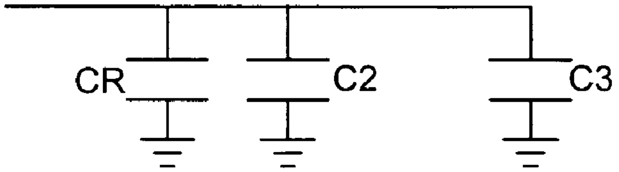
FIG. 8*b* is the equivalent circuit of the reflection area in the sub-pixel segment when the gate lines are set at the second control state.

In the second control state, gate-line 1 is set to low and gate-line 2 is set to high. When gate-line 1=low, the switching elements 240, 245 and the switching element 260 are open ("OFF"). When gate-line 2=high, the switching element 250 is closed ("ON"). In this control state, the capacitors CT and C1 are disconnected from the data line 202, as shown in FIG. 8*a*. The potential of capacitors CT and C2 remain the same voltage for a period of time. Thus, the transmission electrode 160 substantially maintains its original potential $V_{data}$. The capacitors CR and C2 are now connected to the refresh capacitor C3 in parallel as shown in FIG. 8*b*. The overall capacitance associated with the reflection electrode 170 is increased from (CR+C2) to (CR+C2+C3). As a result, the potential on the reflection electrode 170 is reduced. Thus, the voltage differential across the liquid crystal layer in the reflection area is lower than that of the liquid crystal layer in the transmission area.

Using the refresh capacitor C3 and the switching elements 240, 245, 250 and 260, it is possible to control the optical behavior of the liquid crystal layer in the reflection area as compared to that in the transmission area. In order to show the improvement in the viewing quality of the liquid crystal display using the sub-pixel segment, according to the present invention, various values of the refresh capacitor have been used in the response measurement. We have chosen C3/(CR+C2)=⅓, ⅖ and ½.

Figure 9:
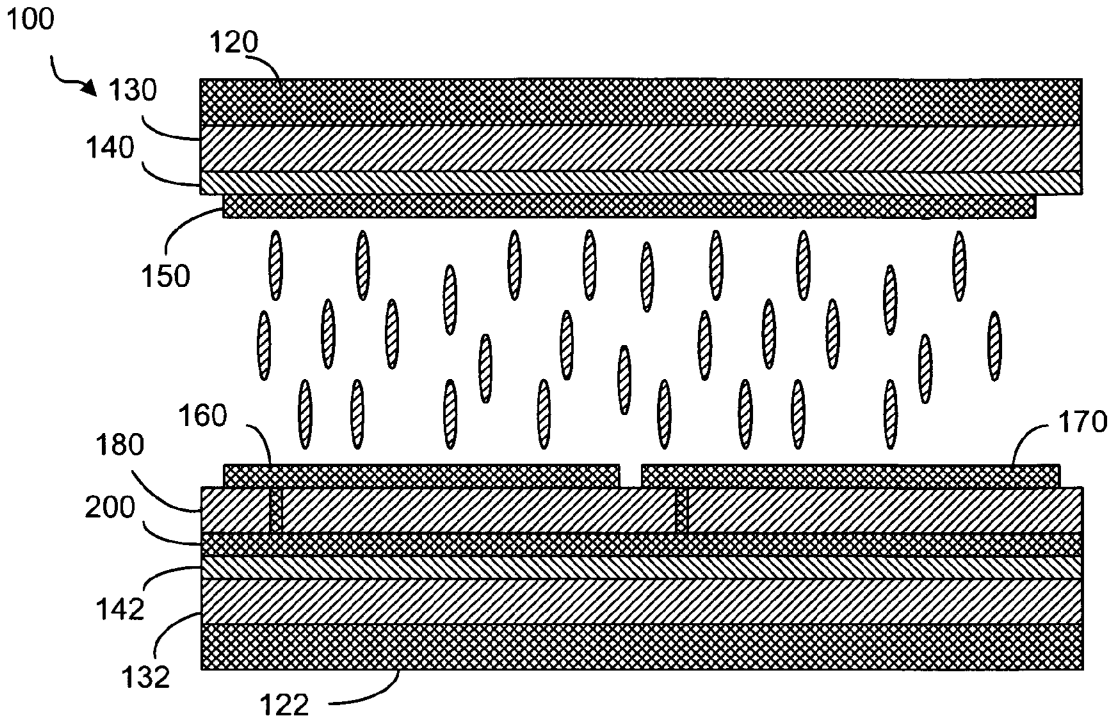
FIG. 9 is a schematic representation showing a sub-pixel segment wherein the liquid crystal molecules are aligned at a first orientation when the liquid crystal layer is subject to an electric field.
Figure 12:
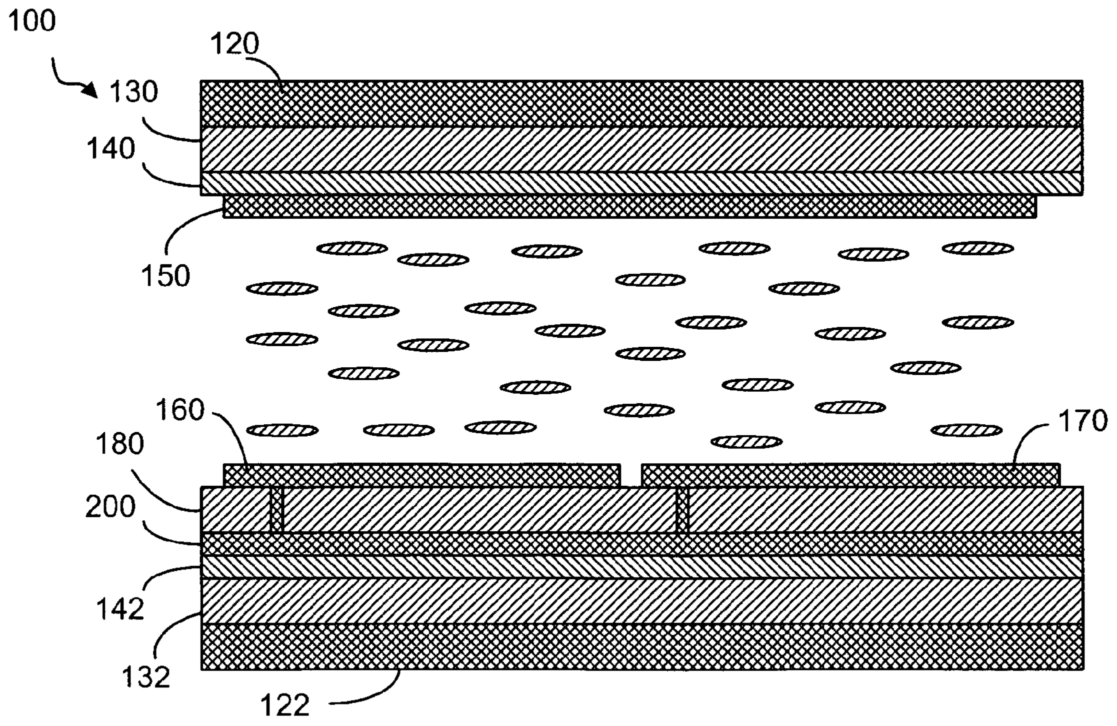
FIG. 12 is a schematic representation showing a sub-pixel segment wherein the liquid crystal molecules are aligned at a second orientation when the liquid crystal layer is subject to an electric field.
Figure 10:
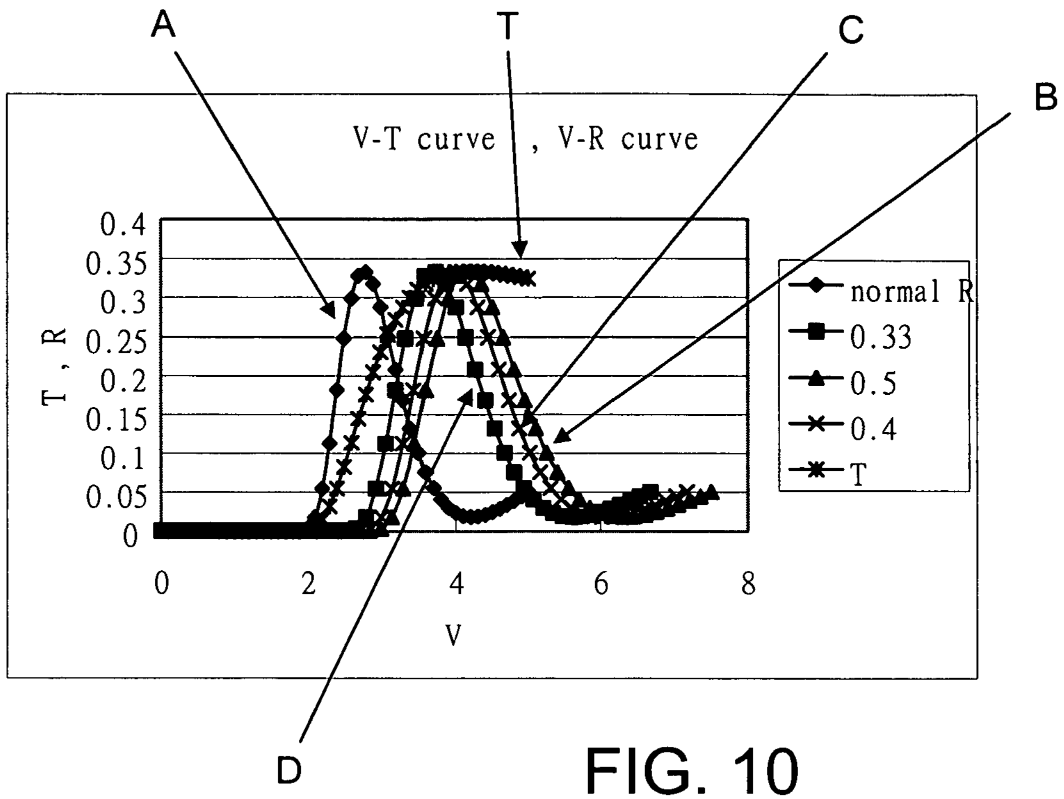
FIG. 10 is a plot showing the response in transmissivity and reflectivity as a function of operational voltage.

Two different polarization states of the liquid crystal layer have been used for response measurement in order to show the improvement in the view quality. In a first response measurement, the liquid crystal display is arranged such that the liquid crystal molecules are aligned in an orientation substantially perpendicular to the electrodes when a voltage potential is applied across the electrodes. A schematic representation of a sub-pixel segment of the liquid crystal display is shown in FIG. 9. A plot of transmissivity (T, normal incidence and direct view) and reflectivity (R, normal incidence and exit) of the liquid crystal layer as a function of operational voltage $V_{data}$ is shown in FIG. 10. As can be seen in FIG. 10, without the capacitance adjustment on the reflection electrode (Curve A), the optimal operational voltage for the reflectivity response occurs at a much lower voltage than the optimal operational voltage for the transmissivity response (Curve T). With C3/(CR+C2)=⅖, the optimal operational voltage for both the transmissivity response and the reflectivity response (Curve C) occur at about 4V. The reflectivity response for C3/(CR+C2)=0.5 is shown as Curve B and that for C3/(CR+C2)=⅓ is shown as Curve D.

Figure 11A:
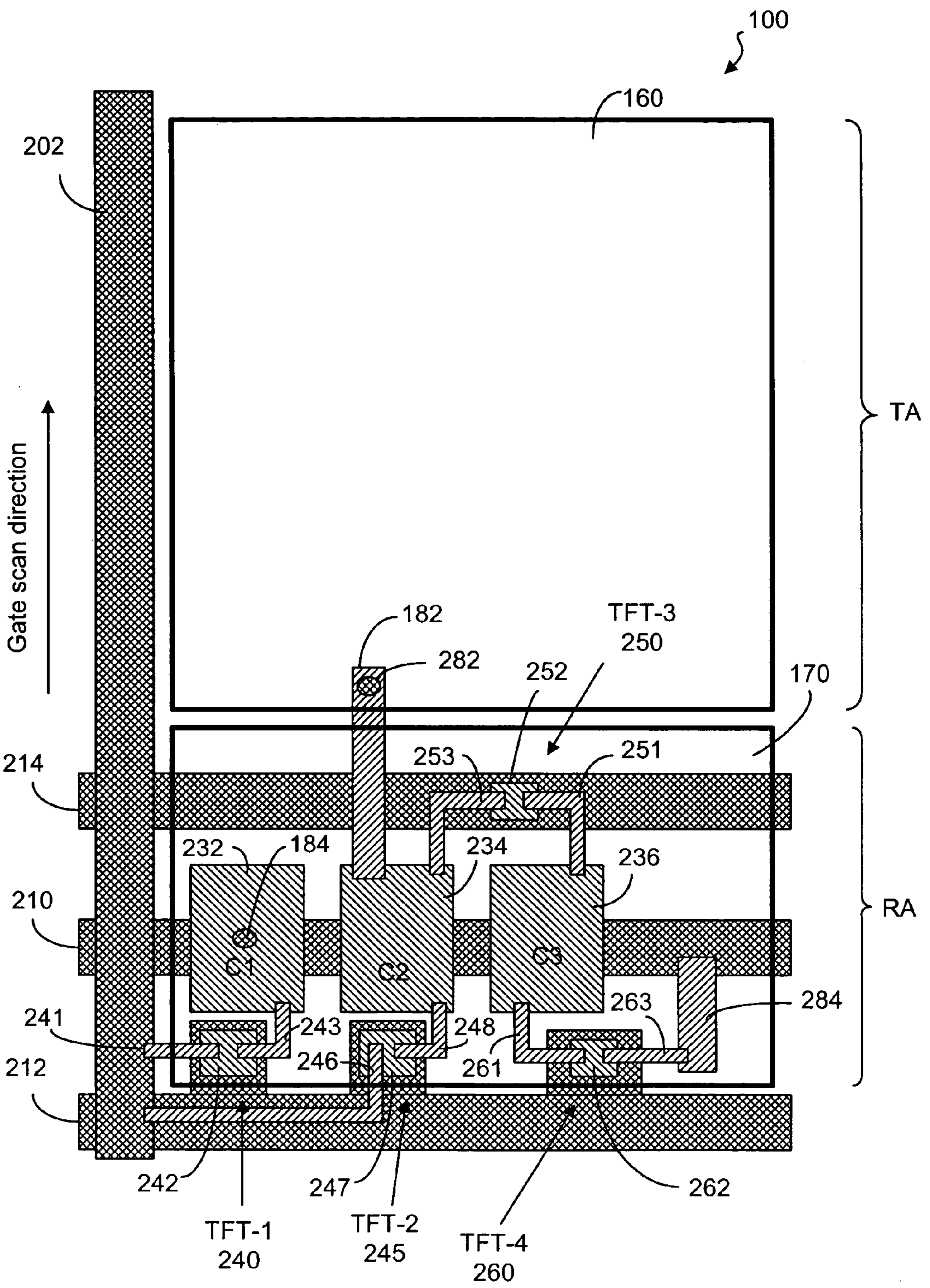
FIG. 11*a* is a plan view showing a sub-pixel segment, according to another embodiment of the present invention.
Figure 11B:
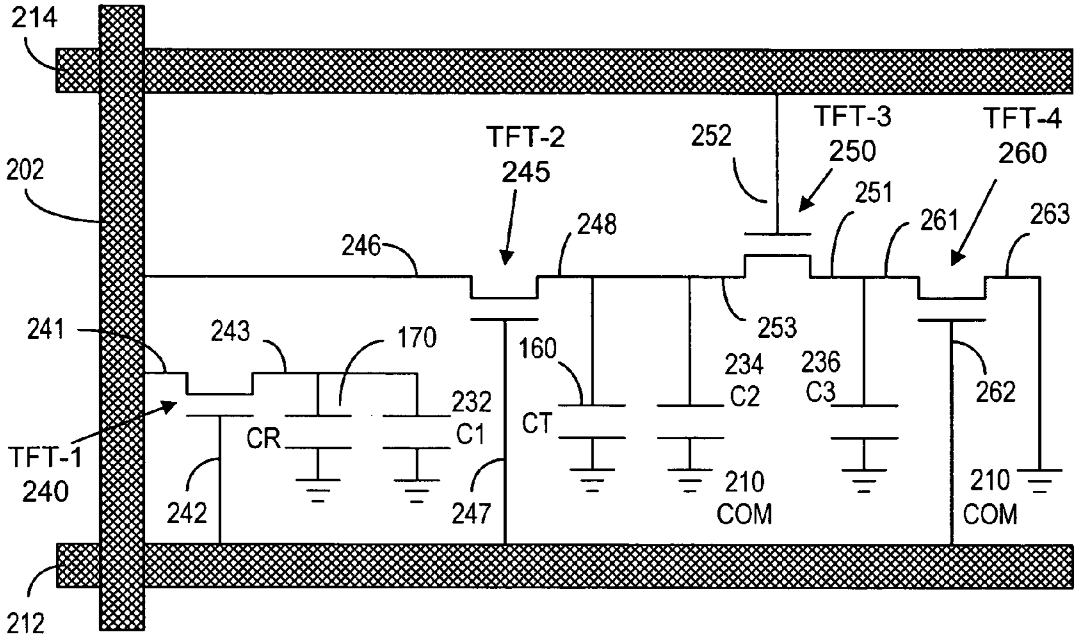
FIG. 11*b* is a circuit diagram showing an equivalent circuit of the sub-pixel segment of FIG. 11*a*.

In another embodiment of the present invention, the first storage capacitor 232 is connected to the reflection electrode 170 and the second storage capacitor 234 is connected to the transmission electrode 160, as shown in FIG. 11*a*. The second storage capacitor 234 is connected to the refresh capacitor 236 through the third switching element 250. The equivalent circuit of this arrangement is shown in FIG. 11*b*. When the control state is switched from (gate-line 1=high, gate-line 2=low) to (gate-line 1=low, gate-line 2=high), the voltage potential of the transmission electrode 160 is reduced by a factor of (CT+C2)/(CT+C2+C3).

Figure 13:
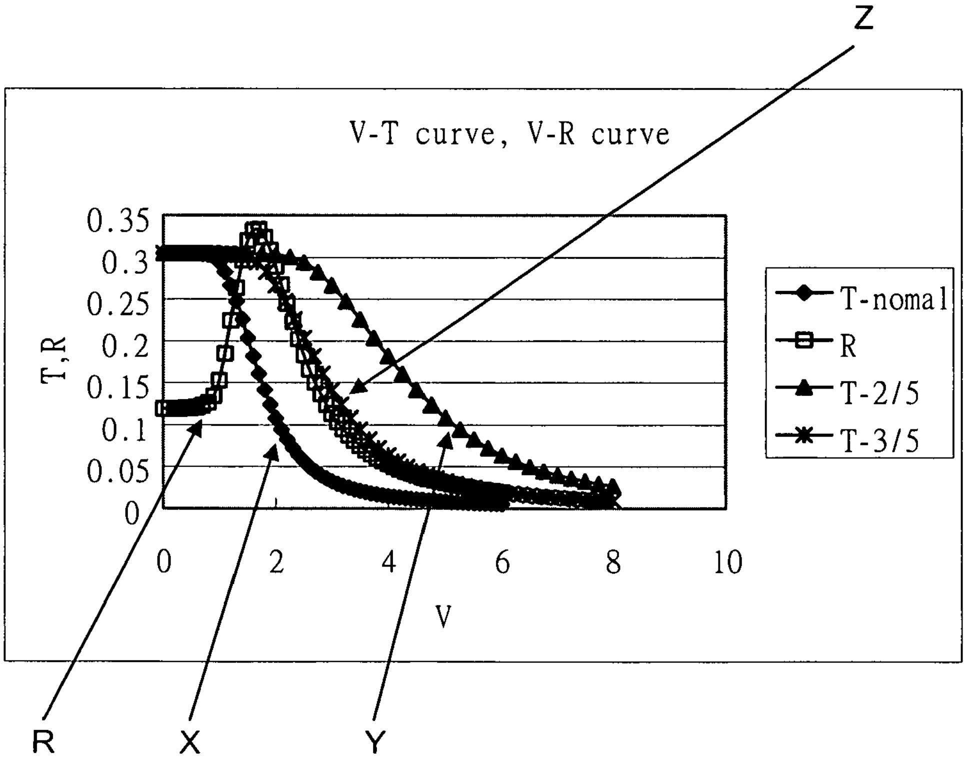
FIG. 13 is a plot showing the response in transmissivity and reflectivity as a function of operational voltage.

This embodiment has been used to measure the responses in transmissivity and reflectivity when the liquid crystal display is arranged such that the liquid crystal molecules are aligned in an orientation substantially parallel to the electrodes when a voltage potential is applied across the electrodes. A schematic representation of a sub-pixel segment of the liquid crystal display is shown in FIG. 11. We have chosen (CT+C2)/(CT+C2+C3)=⅖ and ⅗ in the measurement. A plot of transmissivity (T, normal incidence and direct view) and reflectivity (R, normal incidence and exit) of the liquid crystal layer as a function of operational voltage $V_{data}$ is shown in FIG. 13. As can be seen in FIG. 10, without the capacitance adjustment on the transmission electrode, the transmission response (Curve X) and the reflection response (Curve R) do not match in most of the practical voltage range. With (CT+C2)/(CT+C2+C3)=⅖, the transmissivity response (Curve Y) does not match the reflection response in the practical voltage range. However, with (CT+C2)/(CT+C2+C3)=⅗, the transmissivity response (Curve Z) matches the reflection response reasonably well from $V_{data}$=2V to 6V.

Figure 14B:
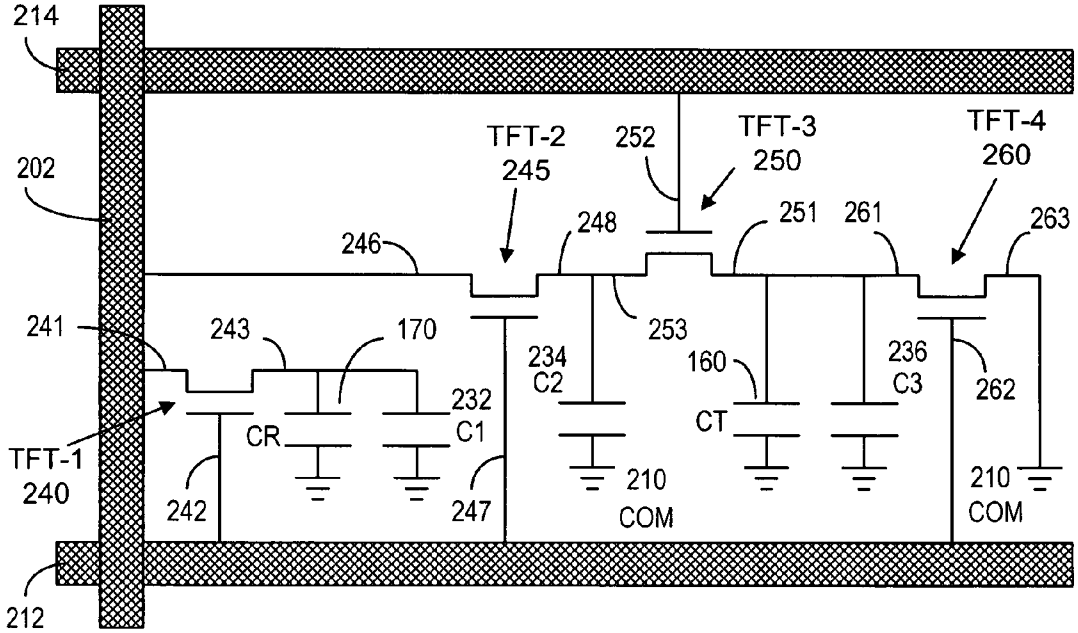
FIG. 14*b* is a circuit diagram showing an equivalent circuit of the sub-pixel segment of FIG. 14*a*.
Figure 14A:
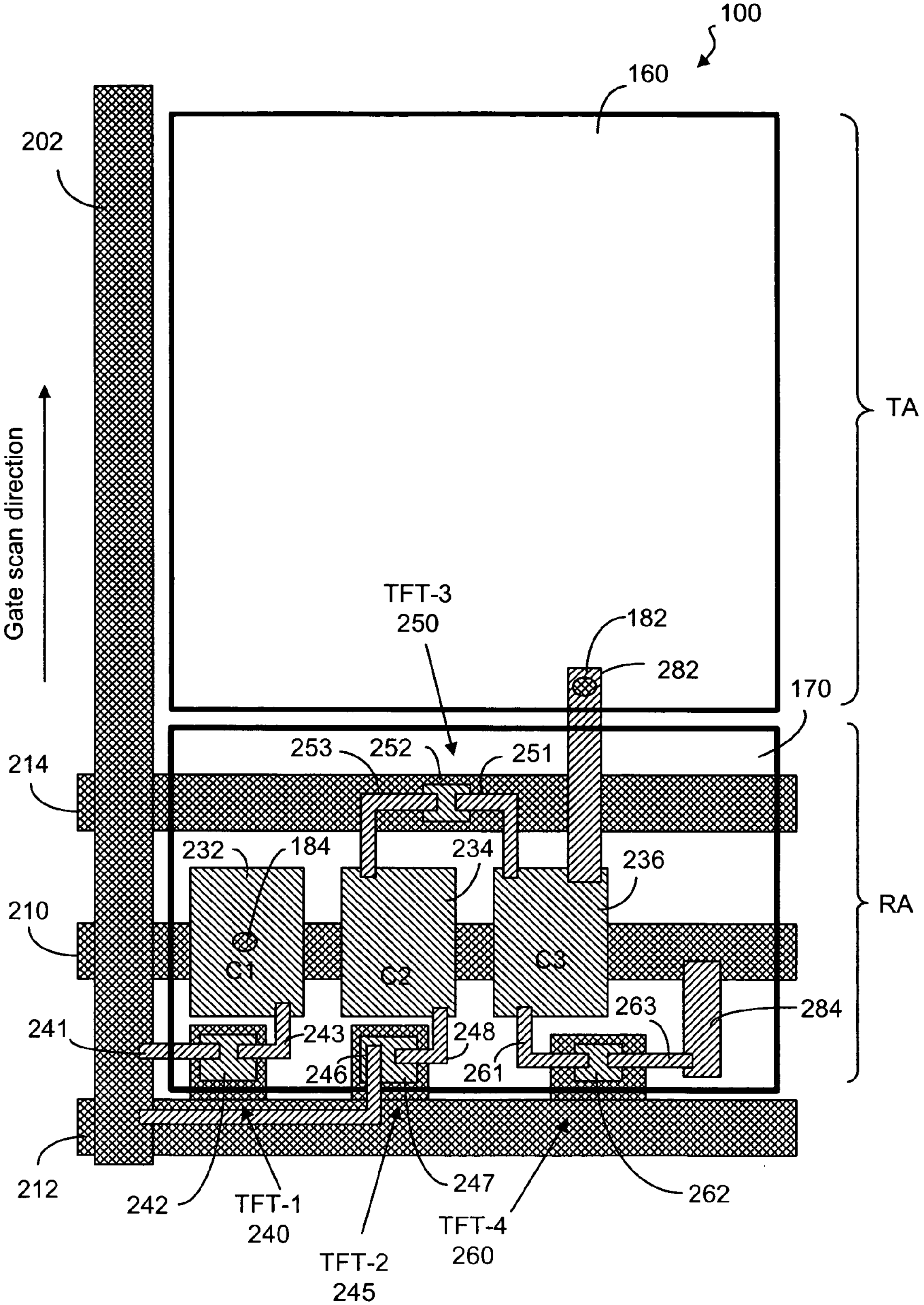
FIG. 14*a* is a plan view showing a sub-pixel segment, according to another embodiment of the present invention.

In yet another embodiment of the present invention, the first storage capacitor 232 is connected to the reflection electrode 170 and the refresh capacitor 236 is connected to the transmission electrode 160, as shown in FIG. 14*a*. The second storage capacitor 234 is connected to the transmission electrode 160 and the refresh storage capacitor 236 via the third switching element 250. The equivalent circuit of this arrangement is shown in FIG. 14*b*. When the control state is set at gate-line 1=high and gate-line 2=low, the refresh storage capacitor 236 is discharged so that the voltage potential between the transmission electrode 160 and the common line 210 becomes zero. At the same time, the second storage capacitor 234 is charged to $V_{data}$. When the control state is switched to gate-line 1=low and gate-line 2=high, the charges on the second storage capacitor 234 are shared by the refresh capacitor 236.

Figure 15B:
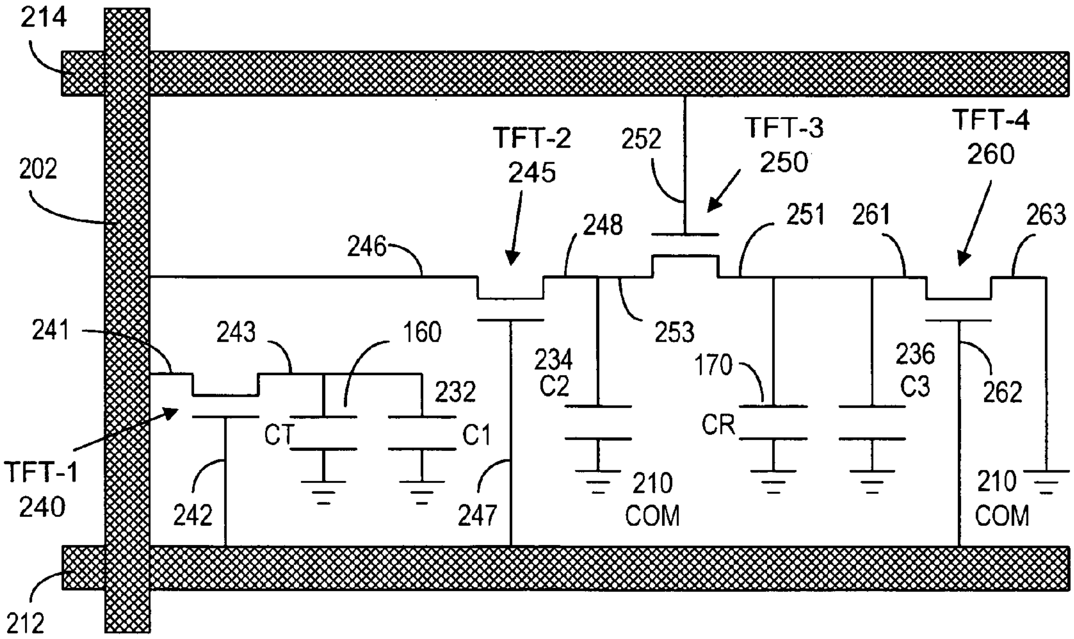
FIG. 15*b* is a circuit diagram showing an equivalent circuit of the sub-pixel segment of FIG. 15*a*.
Figure 15A:
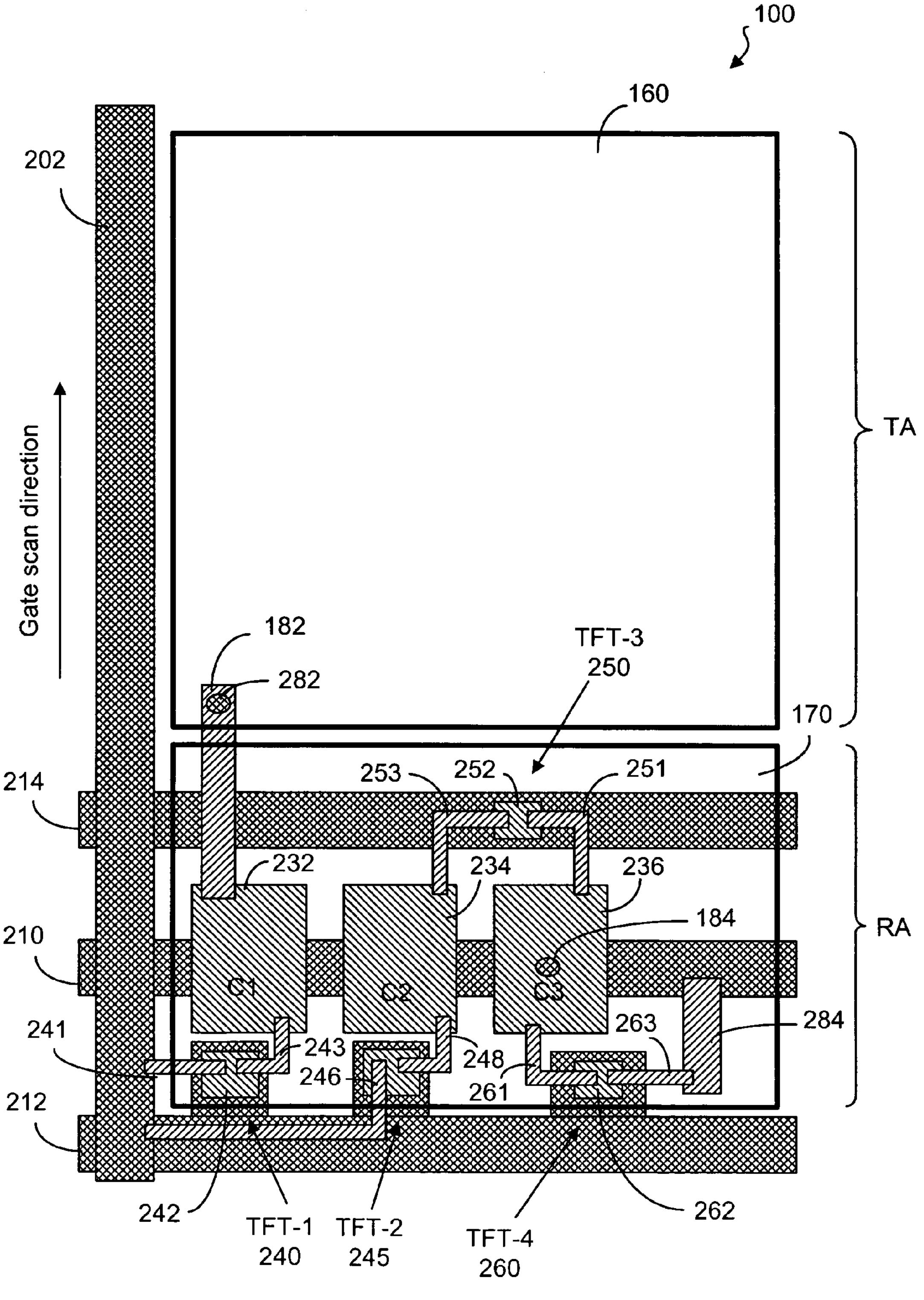
FIG. 15*a* is a plan view showing a sub-pixel segment, according to another embodiment of the present invention.

In still another embodiment of the present invention, the first storage capacitor 232 is connected to the transmission electrode 160 and the refresh capacitor 236 is connected to the reflection electrode 170, as shown in FIG. 15*a*. The second storage capacitor 234 is connected to the reflection electrode 170 and the refresh capacitor 236 via the third switching element 250. The equivalent circuit of this arrangement is shown in FIG. 15*b*. When the control state is set at gate-line 1=high and gate-line 2=low, the refresh capacitor is discharged so that the voltage potential between the reflection electrode 170 and the common line 210 becomes zero. At the same time, the second storage capacitor 234 is charged to $V_{data}$. When the control state is switched to gate-line 1=low and gate-line 2=high, the charges on the second storage capacitor 234 are shared by the refresh capacitor 236.

In sum, by adjusting the capacitance associated with the transmission electrode 160 or the reflection electrode 170, it is possible to improve the matching between the transmission response and the reflectivity response. Capacitance adjustment can be achieved by 1) separately connecting one or more storage capacitors to the transmission electrode and the reflection electrode and 2) connecting one or more refresh capacitors to the transmission electrode or the reflection electrode via a switching element, and 3) connecting the storage capacitors and the refresh capacitors to a plurality of switching elements controllable by at least two gate lines. By setting the gate lines at different control states, it is possible to adjust locally the optical responses of the liquid crystal layer in order to achieve a substantial match between the transmissivity response and the reflection response.

It should be noted that the present invention has been disclosed in conjunction with two embodiments. In the embodiment as shown in FIG. 5*a*, the effective voltage potential applied to the liquid crystal layer in the reflection area is changed by adjusting the capacitance associated with the reflection electrode. In the embodiment as shown in FIG. 9, the effective voltage potential applied to the liquid crystal layer in the transmission area is changed by adjusting the capacitor associated with the transmission electrode. It should be understood that it is possible to adjust both the capacitance associated with the transmission electrode and the capacitance associated with the reflection electrode in the same sub-pixel segment, if so desired.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A liquid crystal display device having an array of pixels, the liquid crystal operable in a first state and in a second state, said display device comprising:

a first substrate having a common electrode;

a second substrate having a plurality of gate lines, a plurality of data lines and a plurality of common lines; the data lines and the gate lines arranged in different directions, and a liquid crystal layer disposed between the first and second substrates, wherein each of at least some of the pixels is associated with a data line, a first gate line and a second gate line, each said pixel comprising:

a first sub-pixel area and a second sub-pixel area, the first sub-pixel area having a first pixel electrode electrically connected to the data line through a first switching element, the second sub-pixel area having a second pixel electrode electrically connected to the data line through a second switching element, the second pixel electrode further connected to a charge refresh capacitor through a third switching element, wherein when the liquid crystal display is operated in the first state, the first and second switching elements are closed ("ON") and the third switching element is open ("OFF"), such that a first voltage potential between the first pixel electrode and the common electrode is substantially equal to a second voltage potential between the second pixel electrode and the common electrode, the second pixel electrode and the refresh capacitor having an electric charge associated therewith, and when the liquid crystal display is operated in the second state, the first and second switching elements are open ("OFF") and the third switching element is closed ("ON") so as to cause a redistribution of the electric charge associated with the second pixel electrode and the refresh capacitor, rendering the first voltage potential being different from the second voltage potential.

2. The display device of claim 1, wherein the first switching element has a control end electrically connected to the first gate line, the second switching element has a control end electrically connected to the first gate line, and the third switching element has a control end electrically connected to the second gate line for causing the respective switching element to close or to open.

3. The display device of claim 1, wherein the third switching element is electrically connected to the refresh capacitor at one capacitor end, and said one capacitor end is further connected to one of the common lines through a fourth switching element, wherein the fourth switching element is closed ("ON") before the third switching element is closed ("ON") and the fourth switching element is open ("OFF") when the third switching element is closed ("ON").

4. The display device of claim 3, each of the first, second and fourth switching elements having a control end electrically connected to the first gate line.

5. The display device of claim 1, wherein the common electrode is electrically connected to one of the common lines.

6. The display device of claim 1, wherein the first sub-pixel area comprises a transmission area and the first pixel electrode is a transmissive electrode, and wherein the second sub-pixel area comprises a reflection area and the second pixel electrode is a reflective electrode.

7. The display device of claim 1, wherein the first sub-pixel area comprises a reflection area and the first pixel electrode is a reflective electrode, and wherein the second sub-pixel area comprises a transmission area and the second pixel electrode is a transmissive electrode.

8. The display device of claim 3, wherein each of the first, second, third and fourth switching element has a control end and each switching element comprises a thin-film transistor and the control end is the gate of the corresponding thin-film transistor.

9. A liquid crystal display device having an array of pixels, the liquid crystal operable in a first state and in a second state, said display device comprising:

a first substrate having a common electrode;

a second substrate having a plurality of gate lines, including a gate-line n and a gate-line n+1, a plurality of data lines including a data line m, and a plurality of common lines; the data lines and the gate lines arranged in different directions, and a liquid crystal layer disposed between the first and second substrates, wherein one of the pixels is associated with the data line m, the gate line n and the gate line n+1, said pixel comprising:

a first sub-pixel area and a second sub-pixel area, the first sub-pixel area having a first pixel electrode electrically connected to the data line m through a first switching element, the second sub-pixel area having a second pixel electrode electrically connected to the data line m through a second switching element, the second sub-pixel area having a refresh capacitor having a first end and a second end, the second end electrically connected to one of the common lines, the second pixel electrode further connected to the first end of the charge refresh capacitor through a third switching element, each of the first and second switching elements having a control end electrically connected to the gate line n, the third switching element having a control end electrically connected to the gate line n+1, wherein when the liquid crystal display is operated in the first state, the first and second switching elements are closed ("ON") and the third switching element is open ("OFF"), such that a first voltage potential between the first pixel electrode and the common electrode is substantially equal to a second voltage potential between the second pixel electrode and the common electrode, the second pixel electrode and the refresh capacitor having an electric charge associated therewith, and when the liquid crystal display is operated in the second state, the first and second switching elements are open ("OFF") and the third switching element is closed ("ON") so as to cause a redistribution of the electric charge associated with the second pixel electrode and the refresh capacitor, rendering the first voltage potential being different from the second voltage potential.

10. The display device of claim 9, wherein said pixel further comprises a fourth switching element and wherein the first end of the refresh capacitor is further connected to a common line through the fourth switching element, the fourth switching element having a control end electrically connected to the gate line n, wherein the fourth switching element is closed ("ON") before the third switching element is closed ("ON") and the fourth switching element is open ("OFF") when the switching third element is closed ("ON").

11. The display device of claim 10, wherein the common electrode is made from a transmissive material, electrically connected to one of the common lines.

12. The display device of claim 11, wherein the first and second pixel electrodes are made from a transmissive material.

13. The display device of claim 11, wherein the first sub-pixel area comprises a transmission area and the first pixel electrode is a transmissive electrode, and wherein the second sub-pixel area comprises a reflection area and the second pixel electrode is a reflective electrode.

14. The display device of claim 11, wherein the first sub-pixel area comprises a reflection area and the first pixel electrode is a reflective electrode, and wherein the second sub-pixel area comprises a transmission area and the second pixel electrode is a transmissive electrode.

* * * * *

UNITED STATES PATENT AND TRADEMARK OFFICE

CERTIFICATE OF CORRECTION

PATENT NO. : 7,286,192 B2
APPLICATION NO. : 11/146568
DATED : October 23, 2007
INVENTOR(S) : Lin et al.

It is certified that error appears in the above-identified patent and that said Letters Patent is hereby corrected as shown below:

Column 3, line 37, “haft” should be --half--.

Column 3, line 48, after “plate”, “.” should be deleted.

Signed and Sealed this

Twenty-fifth Day of March, 2008

JON W. DUDAS
*Director of the United States Patent and Trademark Office*